Patented Mar. 25, 1952

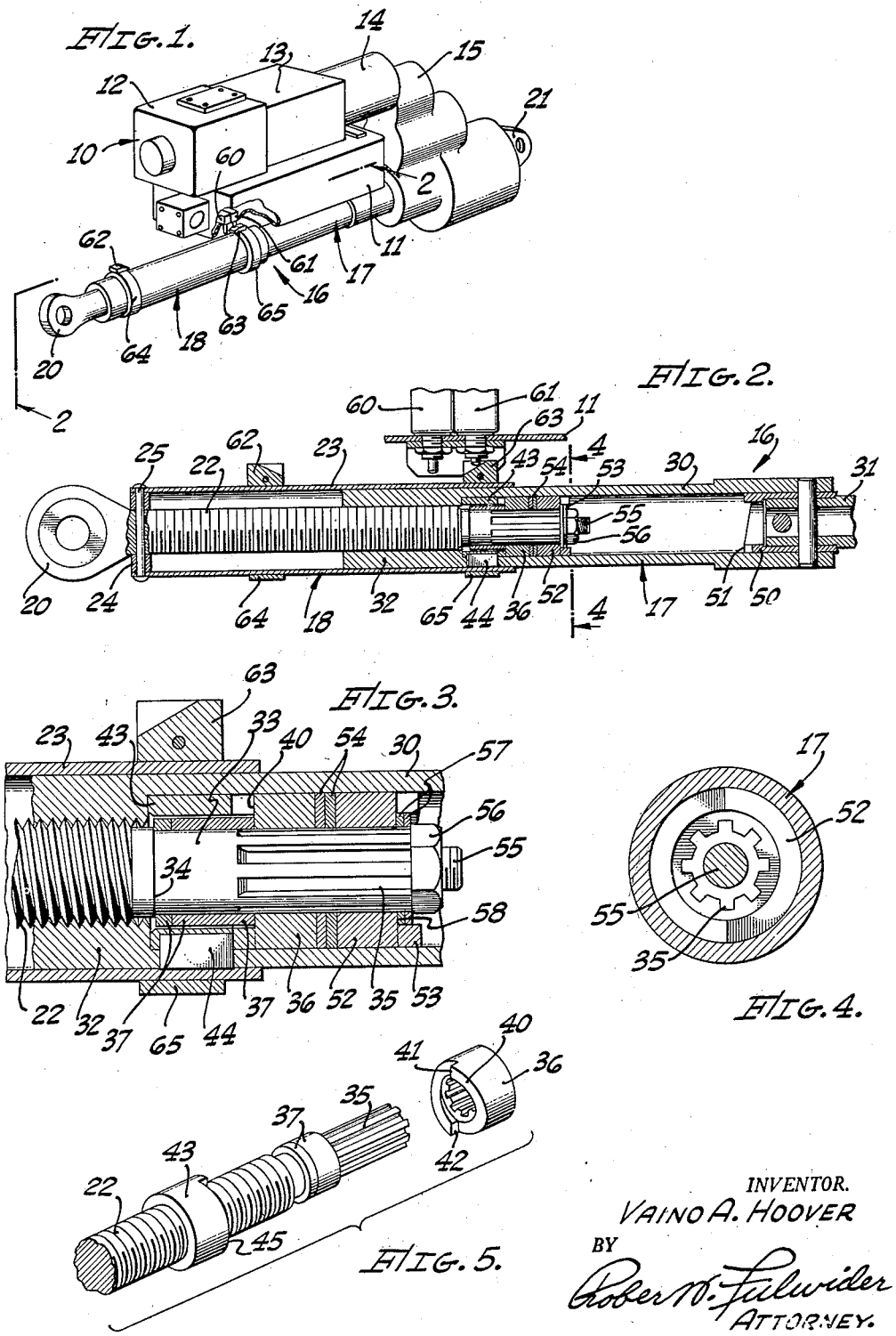

2,590,251

UNITED STATES PATENT OFFICE 2,590,251

MECHANICAL ACTUATOR

Vaino A. Hoover, Los Angeles, Calif.

Application September 29, 1948, Serial No. 51,783

5 Claims. (Cl. 74—424.8)

My invention relates generally to mechanical actuators of the type adapted to change the rotary motion of an electric motor to linear motion, and in particular, my invention contemplates the provision of improved means for converting rotational motion into linear motion, with a positive and accurate stop or limiting means at each end of travel.

The electric motor is a very convenient device for providing mechanical power at remote and inaccessible locations, and it has found extensive use in the remote positioning of various objects as, for example, in the actuation and operation of various devices in an aircraft. However, it is sometimes necessary to provide linear motion instead of rotary motion, and hence some means must be provided to effect this conversion if an electric motor is to be used. Linear actuators have previously been developed making use of a threaded rod and a cooperatively threaded nut, one of these members being rotated with respect to the other to provide the desired linear motion. While this is a partial solution to the problem, some form of limit stop must be provided to prevent the members from being extended or retracted too far. A simple, immovable stop against which one of the movable members abuts has the disadvantage that the nut and screw arrangement produces a wedging action that is quite likely to lock the members in that position.

Additionally, depending upon the speed and inertia of the moving parts, this wedging action will be more severe under some conditions than others, and consequently it is very difficult, if not impossible, to control the limiting positions accurately. While this latter feature may be unimportant in many applications, it is sometimes very important that the actuator move the full length of its travel without exceeding this travel if breakage or damage to the attached members is to be prevented.

It is therefore a major object of my invention to provide an improved linear actuator of simple and rugged construction.

Another object of my invention is to provide such an actuator having improved limit stops that limit the movement of the actuator without jamming.

It is a further object of my invention to provide an actuator of this type in which the natural resilience of the various members aids in separating the stop members when the operation of the actuator is reversed.

Still another object of my invention is to provide an actuator in which all of the various elements, including the limit stops and limit switches, are included in a single unit.

It is a still further object of my invention to provide such an actuator in which both the electrical and mechanical limits of travel may be adjusted over a relatively wide range while still retaining the utmost precision of these limits throughout the entire range.

These and other objects and advantages of my invention will become apparent from the following description of a preferred form thereof, and from the drawings illustrating that form in which:

Figure 1 is a perspective view of my improved actuator assembly;

Figure 2 is an axial cross-sectional view of the extensible members, taken along the line 2—2 of Figure 1;

Figure 3 is an enlarged sectional view of the limit stops shown in Figure 2;

Figure 4 is a cross-sectional view taken at 4—4 in Figure 2, to show the jaw end of one of the limit stops; and Figure 5 is a perspective, exploded view of a pair of limit stops used in my actuator.

Referring now to the drawings and particularly to Figures 1 and 2 thereof, the numeral 10 indicates generally an actuator having a junction and control box 11 and a capacitor and connector box 12 attached to one end of an electric motor 13. A magnetic clutch and brake 14 is connected to the other end of the motor 13, and drives a reduction gear train enclosed within a housing 15. Connected to the output end of the previously mentioned gear train is the linear actuator 16 comprising a rotatable tube 17 and a non-rotatable but linearly movable member 18. It will be understood, of course, that the boxes 11 and 12, the motor 13, the magnetic clutch 14, and the gear train with its housing 15 separately and individually do not constitute my present invention, though as herein combined, they cooperate with each other and the other elements in a new and useful manner.

Turning now to a consideration of the linear actuator 16, it will be noted that the member 18 is provided with an outwardly projecting ear 20 having a hole therein to receive a pin (not shown) connected to the member to be moved. A similar ear 21 is formed on the gear housing 15 for attachment to a stationary member, the ears 20 and 21 thus corresponding to the two members that are to be moved linearly with respect to each other. By the method of their connection, the ears 20 and 21 are held against rotation about the axis of the linear actuator 16 and consequently there can be no rotation of either of these ears.

As best seen in Figure 2, the linearly movable member 18 of the actuator 16 includes a threaded rod 22 whose outer end is provided with an eye to form the ear 20. A tubular housing 23 surrounds the rod 22 and is radially spaced therefrom, being held to the latter by a bushing or collar 24 and a rivet or other suitable means 25. The housing 23 is thus firmly affixed to the rod 22 for movement with the latter, and like the latter, is held by the ear 20 against rotation.

Coaxial with the rod 22 and threadedly engaging it is a tubular member 30 pinned or otherwise suitably attached at one end to a drive shaft 31 connected to the previously mentioned gear train. Throughout the major portion of its length, the internal diameter of the tube 30 is greater than the maximum external diameter of the threaded rod 22, but near its outer end, away from the drive shaft 31, the internal diameter of the tube is decreased to form a nut 32. As may be surmised, the inside of the nut 32 is threaded to engage the threads of the rod 22, and hence rotation of the tube 30 with respect to the rod 22 will move the latter axially with respect to the tube. It will be noted that the housing 23 fits upon the tube 30 so that the latter slides within the housing, closing its inner end and thus preventing the admission of dust and dirt to the threaded rod 22.

It will be appreciated that with only the elements so far described, it would be a simple matter to rotate the tube 30 until the rod 22 jammed against the driving shaft 31, or to rotate the tube in the opposite direction until the rod had been extended to a point where it no longer engaged the threads of the nut 32. Either of these conditions is undesirable, and it is customary to provide stop means to prevent just such an occurrence. However, if the end of the rod 22 is merely enlarged or provided with a collar to bear against the inner end of the nut 32, or to bear against the end of the shaft 31, the undesirable wedging action previously mentioned will be obtained. Furthermore, while such a stop will definitely limit the travel of the rod 22, it does not provide the needed features of adjustability that are often desired. Consequently, I have developed the jaw type stop now to be described.

As best seen in Figure 3, the inner end of the rod 22 is provided with an axially extending projection 33 of reduced diameter, forming a shoulder 34 where it joins the threaded portion of the rod, and a collar 36 is mounted on the projection and held against rotation by splines 35. Spacers or bushings 37 are placed on the projection 33 between the shoulder 34 and the collar 36, the external diameter of the bushings being considerably smaller than the external diameter of the collar and preferably being substantially equal to the maximum diameter of the threaded portion of the rod 22. The external diameter of the collar 36 is substantially equal to the internal diameter of the tube 30, and at its outer end, the collar is provided with an annular portion 40 having a helical cam-shaped surface surrounding the bushing 37.

As seen in Figure 5, the internal diameter of the annular portion 40 is slightly larger than the spacers 37 so that the spacer extends within the annular section to bear against the body of the collar 36. The axially outward face of the annular portion 40 is given a helical shape whose pitch corresponds to the pitch of the threads of rod 22, and in the form shown, the helix has been broken into two sections. Consequently, in traveling circumferentially around the annular portion 40, the cam-shaped surface moves axially outward to the high point or crest of a jaw 41, drops axially inward, and then moves axially outward in a helical path to the crest of a second jaw 42. Since the pitch of the helix between the jaws 41 and 42 is the same as the pitch of the threads on the rod 22, a point which just escapes the crest of the jaw 42 when the collar 36 is rotated, will be at the base of the jaw 41 after the collar is rotated one-half revolution more.

To cooperate with the collar 36 and its annular portion 40, I provide a generally similar cooperating collar 43 at the inner end of the nut 32 and held to the latter by suitable means such as a key 44. The collar 43 has an annular cam-shaped portion 45 comparable to the portion 40, and the jaws of the portion 45 are so located as to engage the jaws 41 and 42 when the collar 43 is rotated with respect to the collar 36.

As indicated in Figure 3, the internal diameter of the collar 43 is sufficient to permit free movement of the rod 22 when the latter is moved inwardly to retracted position; and the outer diameter of the collar is substantially equal to the internal diameter of the tube 30 so that the collar seats firmly against the nut 32 without radial movement. The key 44 is preferably inserted through the wall of the tube 30, and thus holds the collar 43 against both rotational and axial movement with respect to the tube.

The action of the collars 36 and 43 may now be understood. Assuming that the rod 22 is in a retracted position so that the threaded portion thereof extends through the collar 43 and projects beyond it, rotation of the tube 30 in the proper direction will turn the nut 32 so that the rod is moved axially outward. Since the rod 22 is held against axial rotation, the collar 36 which is splined to the rod will likewise be held against rotation.

Similarly, the nut 32 at the outer end of the tube 30 will be rotated, as will the collar 43. Therefore, as the rod 22 is extended, the collar 36 moves axially but without rotation, while the collar 43 rotates while remaining in the same axial position. Immediately before the rod 22 reaches its outer limit of travel, the collar 36 approaches the collar 43 so that the jaws 41 and 42 just clear the corresponding jaws of the collar 43. The collar 36 then continues its outward movement while the tube 30 completes another one-half revolution, at which time the collar 36 has moved outwardly a distance sufficient for its jaws 41 and 42 to be struck and fully engaged by the corresponding jaws of the collar 43. Further rotation of the collar 43 and hence of the tube 30 is thus impossible, and the outward travel of the rod 22 is therefore stopped.

To limit the inward travel of the rod 22, a similar stop is provided at the inner end of the rotatable member 30. A collar 50, similar to the collar 43, is fitted within the inner end of the tube 30 and is pinned or otherwise securely held to the driving shaft 31 for rotation with it and the tube. The outer end of the collar 50 is provided with an annular cam-shaped portion 51 similar to the portion 45 of the collar 43, and a cooperating collar 52, similar to the collar 36 previously described, is mounted on the splined end of the projection 33, adjacent the collar 36. The collar 52 has an annular cam-shaped portion 53 corresponding to the similar portion 40 of the collar 36, and is mounted on the projection 33 so that its jaws project inwardly to engage the corresponding jaws of the collar 50.

It will be appreciated that the collars 36 and 52 are placed back to back on the splined projection 33, with the jaws 41 and 42 of the collar 36 projecting outwardly, toward the ear 20, while the corresponding jaws of the collar 52 project inwardly toward the driving shaft 31. The adjacent faces of the collars 36 and 52 are plane, and I preferably insert spacers or washers 54 between these plane faces so that the axial position of the collar 52 may be adjusted. As indicated in Figures 2 and 3, a stud 55 projects inwardly from the end of the projection 33, and a nut 56 threadedly engages the stud to bear against spacer washers 57 which surround the splined shaft end 35 and bear against a recessed surface 58 of the collar 52 and hold it immovable with respect to the rod 22. By adding or removing the washers 54 and washers 57, the axial position of the collar 52 may be varied to change the inward limit of travel of the rod 22. In a similar manner, by adding or removing the spacers or bushings 37, the axial position of the collar 36 may likewise be changed to adjust the outward limit of travel of the rod 22.

It will be appreciated that to secure the best results, the axially extending faces of the jaws 41 and 42 should completely engage and bear against the axially extending faces of the corresponding jaws of the collar 43. If only the tips of the jaws are engaged, the stress concentration will be much higher, and the resulting operation will generally be less satisfactory. Consequently, while the axial position of the collar 36 with respect to the shoulder 34 may be determined by the spacers or bushings 37, the jaws 41 and 42 of the collar 36 must be angularly located so that they completely engage the corresponding jaws of the collar 43. This adjustment may easily be made by removing the nut 56, the collar 52, and the washers 54 so that the collar 36 may be removed from the projection 33 and rotated the desired amount. Since the splines 35 are spaced uniformly around the circumference of the projection 33, the collar 36 is both axially and rotationally adjustable with respect to the rod 22.

In a similar manner, the axial and rotational position of the collar 52 may be adjusted to control the inner limiting position of the rod 22. It will be appreciated, of course, that if the outer limiting position of the rod 22 is to be changed and the inner limiting position is to remain the same, washers 54 must be added as bushings 37 are removed, and vice versa, in order that the collar 52 retain its same axial position with respect to the rod.

In the operation of my improved linear actuator, the motor 13 drives the gear train within the housing 15 to rotate the drive shaft 31. Assuming that the drive shaft is rotated in a direction to extend the rod 22, the tube 30 is turned about its axis, rotating the nut 32 to move the non-rotatable rod outwardly. When the rod 22 has reached its outer limit of travel, the jaws 41 and 42 of the collar 36 will engage the corresponding jaws of the collar 43 to stop rotation of the tube 30. However, if the tube 30 has been turning at any appreciable speed, its momentum and that of the gear train within the housing 15 will tend to continue this rotation, thereby applying a considerable torque to the cooperating jaws of the collars 36 and 43. If the jaws of the collar 36 were held against any possibility of rotational movement, the impact produced by their engagement by the jaws of the collar 43 would be such as to impose severe stresses on all of the rotating equipment. However, it will be noted that there is a considerable length of rod 22 between the ear 20 and the splines 35, and because of the torsional elasticity of the rod, the latter may be twisted slightly when the jaws engage. The shock of impact, while still appreciable, is thus considerably reduced, and the resulting twisting of the rod 22 acts to urge the collar 43 and the rotatable nut 32 in the reverse direction, thereby tending to move the rod 22 in the opposite direction or inwardly. While the tube 30 may twist slightly, the amount of this latter twisting is so small as to be negligible for most purposes.

In a similar manner, when the rod 22 reaches its inward limit of travel, the jaws of the collar 52 engage the jaws of the collar 50 so that the rod is again twisted slightly to reduce the severity of the impact. Likewise, the effect of the resulting torsional stress is to urge the collar 50 away from the collar 52, thereby insuring the immediate release of the stop or locking mechanism when the motor 13 is operated in a reverse direction. This, it will be appreciated, is a vast improvement over the results obtained when the rod 22 is moved into axial bearing engagement with a stop, causing the undesirable jamming action previously described.

To complete my improved linear actuator, I provide limit switches to interrupt the flow of current to the motor 13 just prior to the engagement of the jaws of the stop mechanism. It will be realized that so long as the limit switches operate properly, the jaw type limit stop just described is unnecessary. However, where the utmost reliability in service is required, as in certain applications on aircraft, every precaution must be taken to prevent the jamming or injury of any of the parts. The construction and connection of the limit switches in and of themselves forms no part of my present invention, since such switches are conventionally used in a well known manner to prevent the rotation of a motor 13 in one direction, while permitting its rotation in the opposite direction. Thus, it is conventional to provide a pair of normally closed switches in the field circuit of a reversible motor so that opening one of the switches prevents the driving of the motor in a corresponding direction. The two switches are generally separated and are independently operated so that only one of them will be opened at any one time.

I have provided my improved linear actuator with such a pair of limit switches 60 and 61, mounted in the junction and control box 11 adjacent the linear actuator 16. Each of the switches 60 and 61 is provided with an outwardly projecting operating plunger, and in their normal position, the switches close circuits to corresponding field windings of the motor 13. However, when the plunger of one of the switches 60 or 61 is pressed inwardly, toward the box 11, the circuit to one of the field windings of the motor 13 is broken, thereby preventing further rotation of the motor in a corresponding direction. Assuming that forward rotation of the motor 13 extends the rod 22 and ear 20, and reverse rotation of the motor retracts the rod and ear, the switch 60 is connected to control reverse rotation of the motor, while the switch 61 is connected to control forward rotation.

Mounted on the exterior of the sleeve or housing 23 are cam members 62 and 63 movable into alignment with the switches 60 and 61, respectively. The cams 62 and 63 are firmly but adjustably held to the housing 23 in any suitable manner as by bands 64 and 65, respectively, encircling the housing, and the cams 62 and 63 may easily and quickly be set to engage the switches 60 and 61 at any desired position of the rod 22 and ear 20. Normally, of course, the cams 62 and 63 will be set to interrupt the current to the motor 13 just before the jaw type stop mechanisms are engaged, but it will be appreciated that if so desired, the electrical limit controls may be set to operate much sooner than the mechanical limit controls.

By mounting the switches 60 and 61 in the box 11, and by placing the cams 62 and 63 on the linear actuator 16, I provide a complete assembly having its own limit control mechanism, and one in which the electrical limit controls are operated by the linear actuator itself immediately adjacent the point of application of the power developed by that actuator. Previously, actuators and servo-mechanisms have been built which were provided with their own limit switches, but these limit switches have been located close to the motor or power input side of the mechanism, rather than adjacent the power output side. As a result, any failure of the power transmission system, such as a gear train, has not affected the operation of the limit switches, and consequently serious damage has sometimes been caused by such failures.

Other actuators and servo-mechanisms have had limit switches installed adjacent the driven member, operated by that member or by the final connecting link in the power mechanism driving that member. However, this latter arrangement has required the separate installation of limit switches and their individual adjustment to meet the particular requirements imposed upon them, and while often more satisfactory than the inbuilt limit switches previously mentioned, this has meant additional work in the original design and construction of the equipment.

By the use of my improved linear actuator, the advantages of limit switches operated by the final connecting member are secured, while the advantages of the inbuilt limit switches are retained. Furthermore, by using this actuator, the limit switches and jaw type limit stops may be adjusted with the actuator removed from the mechanism it drives, and placed upon a bench where all adjustments may quickly and easily be made with great accuracy. This again represents a considerable step forward, since it is always preferable to adjust a unit when it is in a sub-assembly stage rather than after it has finally been installed in a mechanically complex device.

While I have shown my improved linear actuator as it will appear when constructed with a rod 22 having a double thread formed thereon, it will be apparent that a greater or lesser number of threads of any desired pitch may be provided, corresponding changes being made in the jaws or annular cam surfaces of the collars 36, 43, 50, and 52. Likewise, other connecting and adjusting means for positioning and holding the collars and various parts may be used, if so desired. These and other changes and modifications will be apparent to those skilled in the art, and are clearly within the scope of the invention defined herein. Consequently, I do not wish to be restricted to the particular form or arrangement of parts herein described and shown, except as limited by my claims.

I claim:

1. A linear actuator of the class described which includes: a female screw-threaded rotatable and axially immovable driving member; a male screw-threaded non-rotatable driven member threadedly engaging said driving member and axially movable with respect thereto, said female driving member defining an elongated tubular bearing surface; connecting means attached to one end of said driven member for connection to a load to be moved by said linear actuator; a first stop member connected to said driving member for rotation therewith having a jaw with a generally axially extending face; and a second stop member connected to said driven member at the other end thereof remote from said connecting means for axial movement therewith and having a jaw with a generally axially extending face, said first and second stop members being located so that the jaws thereof engage to prevent further rotation of said driving member in one direction when said driven member has reached the limit of its axial travel in said direction, said second stop member defining an outer cylindrical bearing surface engaging and coacting with said elongated tubular bearing surface to support and guide said other end of said driven member during the relative axial and rotational movement of said driven and driving members.

2. A linear actuator of the class described which includes: a female screw-threaded rotatable and axially immovable driving member; a male screw-threaded non-rotatable driven member threadedly engaging said driving member and axially movable with respect thereto, said female driving member defining an elongated tubular bearing surface; connecting means attached to one end of said driven member for connection to a load to be moved by said linear actuator; a first pair of stop members connected to said driving members for rotation therewith, each having a jaw with a generally axially extending face; and a second pair of stop members connected to said driven member at the other end thereof remote from said connecting means for axial movement therewith, each having a jaw with a generally axially extending face, said first and second pairs of stop members being located so that the jaws of one of said first pair and one of said second pair engage to prevent further rotation of said driving member in one direction when said driven member has reached one limit of its axial travel, and the jaws of the remaining stop members engage to prevent further rotation of said driving member in the opposite direction when said driven member has reached the other limit of its axial travel, said second pair of stop members defining an outer cylindrical bearing surface engaging and coacting with said elongated tubular bearing surface to support and guide said other end of said driven member during the relative axial and rotational movement of said driven and driving members.

3. A linear actuator of the class described which includes: a screw-threaded rotatable driving member; a screw-threaded non-rotatable driven member threadedly engaging said driving member and axially movable with respect thereto; a first stop member connected to said driving member and having an axially extending jaw; a second stop member carried by said driven member and having an axially extending jaw for engaging the corresponding jaw of said first stop member to prevent rotation of said screw-threaded members with respect to one another in one direction; a shoulder on said driven member defining a reduced diameter portion, said second stop member having a bore for receiving said reduced diameter portion, said portion having a length exceeding the axial length of said second stop member by a given amount; spacers having an aggregate thickness at least equal to said given amount surrounding said reduced diameter portion; and means for clamping said second stop member and said spacers against said shoulder.

4. A linear actuator of the class described which includes: a screw-threaded rotatable driving member; a screw-threaded non-rotatable driven member threadedly engaging said driving member and axially movable with respect thereto; a first stop member connected to said driving member and having an axially extending jaw; a second stop member carried by said driven member and having an axially extending jaw for engaging the corresponding jaw of said first stop member to prevent rotation of said screw-threaded members with respect to one another in one direction; a shoulder on said driven member defining a reduced diameter portion, said portion having axial splines formed thereon, said second stop member having a splined bore for receiving said splined reduced diameter portion; and means for clamping said second stop member against said shoulder.

5. A linear actuator of the class described which includes: a screw-threaded rotatable driving member; a screw-threaded non-rotatable driven member threadedly engaging said driving member and axially movable with respect thereto; a first stop member connected to said driving member and having an axially extending jaw; a second stop member carried by said driven member and having an axially extending jaw for engaging the corresponding jaw of said first stop member to prevent rotation of said screw-threaded members with respect to one another in one direction; a shoulder on said driven member defining a reduced diameter portion, said portion having axial splines formed thereon, said second stop member having a splined bore for receiving said splined reduced diameter portion, said portion having a length exceeding the axial length of said second stop member by a given amount; spacers having an aggregate thickness at least equal to said given amount surrounding said reduced diameter portion; and means for clamping said second stop member and said spacers against said shoulder.

VAINO A. HOOVER.

REFERENCES CITED

The following references are of record in the file of this patent:

UNITED STATES PATENTS

| Number | Name | Date |
| --- | --- | --- |
| 2,356,861 | Link | Aug. 29, 1944 |
| 2,410,695 | Werner | Nov. 5, 1946 |
| 2,441,505 | Ochtman | May 11, 1948 |
| 2,446,393 | Russell | Aug. 13, 1948 |
| 2,479,019 | Ochtman | Aug. 16, 1949 |